US008521409B2

(12) United States Patent
Gu et al.

(10) Patent No.: US 8,521,409 B2
(45) Date of Patent: Aug. 27, 2013

(54) CONTINUOUS DRIVING MILEAGE CALCULATION CONTROL SYSTEM AND CALCULATION CONTROL METHOD

(75) Inventors: Xuejian Gu, Wuhu (CN); Jianyou Ba, Wuhu (CN); Yuejin Sun, Wuhu (CN); Songling Zhao, Wuhu (CN); Lvgen Fang, Wuhu (CN); Jun Deng, Wuhu (CN); Xinhua Gao, Wuhu (CN)

(73) Assignees: Chery Automobile Co., Ltd., Wuhu (CN); Wuhu Power-Technology Research Co., Ltd., Wuhu (CN)

( * ) Notice: Subject to any disclaimer, the term of this patent is extended or adjusted under 35 U.S.C. 154(b) by 134 days.

(21) Appl. No.: 13/144,024

(22) PCT Filed: Dec. 28, 2009

(86) PCT No.: PCT/CN2009/076128
§ 371 (c)(1),
(2), (4) Date: Jul. 11, 2011

(87) PCT Pub. No.: WO2010/078813
PCT Pub. Date: Jul. 15, 2010

(65) Prior Publication Data
US 2011/0270515 A1    Nov. 3, 2011

(30) Foreign Application Priority Data
Jan. 12, 2009   (CN) .......................... 2009 1 0001550

(51) Int. Cl.
*G06F 19/00*    (2011.01)
(52) U.S. Cl.
USPC ............................................ 701/123; 701/36
(58) Field of Classification Search
USPC .................. 701/123, 36; 73/114.53, 114.54, 73/114.52
See application file for complete search history.

(56) References Cited

U.S. PATENT DOCUMENTS

| 4,179,740 A | * 12/1979 | Malin ........................... 701/123 |
| 4,400,779 A | 8/1983 | Kosuge et al. ................. 364/442 |
| 4,663,718 A | 5/1987 | Augello et al. ............... 364/444 |

FOREIGN PATENT DOCUMENTS

| CN | 101464174 A | 6/2009 |
| JP | 56122915 A | 9/1981 |
| JP | 60036917 A | 2/1985 |

OTHER PUBLICATIONS

International Search Report corresponding to co-pending International Patent Application Serial No. PCT/CN2009/076128; dated Apr. 8, 2010.

* cited by examiner

*Primary Examiner* — Yonel Beaulieu
(74) *Attorney, Agent, or Firm* — Nixon Peabody LLP

(57) ABSTRACT

The invention discloses a continuous driving mileage calculation control system and a calculation control method. The calculation control system comprises an MCU microprocessor, a continuous driving mileage digital display, a vehicle speed signal sampling circuit, an instantaneous fuel consumption signal sampling circuit and a fuel signal sampling circuit. According to the received instantaneous fuel consumption signal and the vehicle speed signal, the MCU microprocessor calculates the average fuel consumption, and then calculates the continuous driving mileage according to the average fuel consumption and the current remaining fuel amount. The digital display is used for displaying the continuous driving mileage. The average fuel consumption refers to the amount of fuel consumption per hundred kilometers between two refilling; and the remaining fuel amount is obtained by deducting the amount of fuel consumption calculated according to the instantaneous fuel consumption signal from the amount of remaining fuel amount measured right after the refilling.

17 Claims, 3 Drawing Sheets

CONTINUOUS DRIVING MILEAGE CALCULATION CONTROL SYSTEM AND CALCULATION CONTROL METHOD

CROSS REFERENCE TO RELATED APPLICATIONS

This application is a U.S. national stage application claiming priority from International Application No. PCT/CN2009/076128, filed Dec. 28, 2009, and further claiming priority to Chinese patent application No. 200910001550.4, filed on Jan. 12, 2009, each of which is incorporated herein in its entirety.

FIELD OF THE INVENTION

The present invention relates to the field of automobile, in particular to a continuous driving mileage calculation control system and a calculation control method.

DESCRIPTION OF THE PRIOR ART

Basically, a continuous driving mileage calculation of automobiles available in today's market is based on a simple principle, that is, using the remaining fuel amount and average fuel consumption to calculate how longer distance the vehicle can drive on the remaining fuel. However the drawback of such a calculation method is that the calculated result can not truly and accurately reflect the continuous driving mileage if the current driving situation remains unchanged because the average fuel consumption is calculated as the integral of the instantaneous fuel consumption and the vehicle speed, and the average fuel consumption can infinitely approximate a fixed value once the vehicle has run a certain distance.

A method for calculating the average fuel consumption is disclosed in Chinese patent application 03139937.1. In this method, the average fuel consumption is calculated based on the relation of the fuel consumption in a period of time and the mileage accumulated in this period of time. This method has the following defect: The average fuel consumption will approximate a fixed value after a time, so this method fails to truly reflect the average fuel consumption and results in inaccurate continuous driving mileage calculation.

SUMMARY OF THE INVENTION

The technical object of the present invention is to provide a new control method for continuous driving mileage function calculation control strategy, which can accurately calculate the distance that can sustain under the current vehicle's conditions according to the current fuel amount and the current average fuel consumption. The specific technical solution is described as follows:

This invention provides A continuous driving mileage calculation control system, comprising an MCU microprocessor, a continuous driving mileage digital display, a vehicle speed signal sampling circuit, an instantaneous fuel consumption signal sampling circuit and a fuel signal sampling circuit; wherein the vehicle speed signal sampling circuit, the instantaneous fuel consumption signal sampling circuit and the fuel signal sampling circuit are connected to the MCU microprocessor and input the sampling signals to the MCU microprocessor; wherein, the MCU microprocessor calculates the average fuel consumption according to the received instantaneous fuel consumption signal and the vehicle speed signal, and then calculates the continuous driving mileage according to the average fuel consumption and the current remaining fuel amount; the digital display is used for displaying the continuous driving mileage.

the average fuel consumption mentioned above refers to the amount of fuel consumption per hundred kilometers between two refilling; and the remaining fuel amount mentioned above is obtained by deducting the amount of fuel consumption calculated according to the instantaneous fuel consumption signal from the amount of fuel measured right after the refilling; the refilling mentioned above means that the fuel volume measured at the time of automotive ignition is increased by more than 5 liter than the fuel volume measured upon prior shutting down, and the average fuel consumption is automatically reset right after refilling.

The instantaneous fuel consumption signal is obtained by acquiring the engine fuel injector operating pulses that are issued by the engine control unit ECU; the fuel signal refers to the resistance signal of fuel system detected by the fuel sensor.

Within a specific distance after the refilling, rated average fuel consumption is used for calculating the continuous driving mileage.

The remaining fuel volume is processed so that the actual continuous driving mileage is bigger than the value shown on the digital display by more than 20 km.

The present invention also discloses a continuous driving mileage calculation control method comprising the following steps:

The MCU Microprocessor receives the instantaneous fuel consumption signal, the vehicle speed signal and the fuel signal;

The average fuel consumption is calculated according to the instantaneous fuel consumption signal and the vehicle speed signal;

The continuous driving mileage is calculated according to the average fuel consumption and the current remaining fuel amount;

The continuous driving mileage is displayed on the digital display.

The system and the method provided in the invention are capable of reminding a user how long distance the remaining fuel in the fuel tank can sustain the journey if the current driving situation remains unchanged. The invention has the characteristics of intelligentization and humanization.

Figure 2:
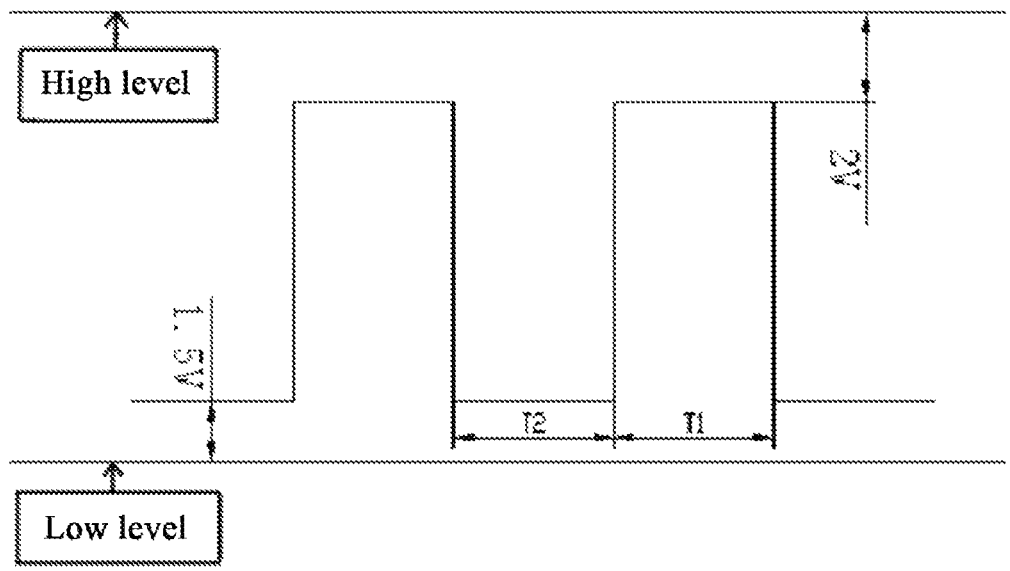
FIG. 2 is the vehicle speed signal sampling graph.
Figure 4:
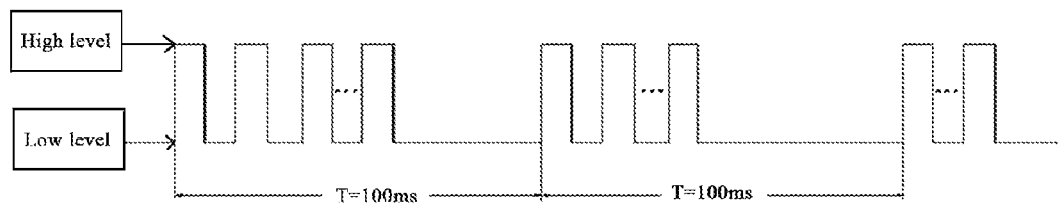
FIG. 4 illustrates that the engine control unit ECU transmits pulse signals to the integrated instrument ICM every 100 ms.

Where:

In FIG. 2: Range of duty cycle: 50%±10%;

High level range of signal=ignition voltage Ign~2V;

Low level range of signal=0~+1.5V;

In FIG. 4: High Level=(ignition voltage Ign−2)V~ignition voltage Ign,

Low level=0~1.5.

DETAILED DESCRIPTION OF PREFERRED EMBODIMENTS

Below is detailed description of the present invention with reference to the attached drawings.

Figure 1:
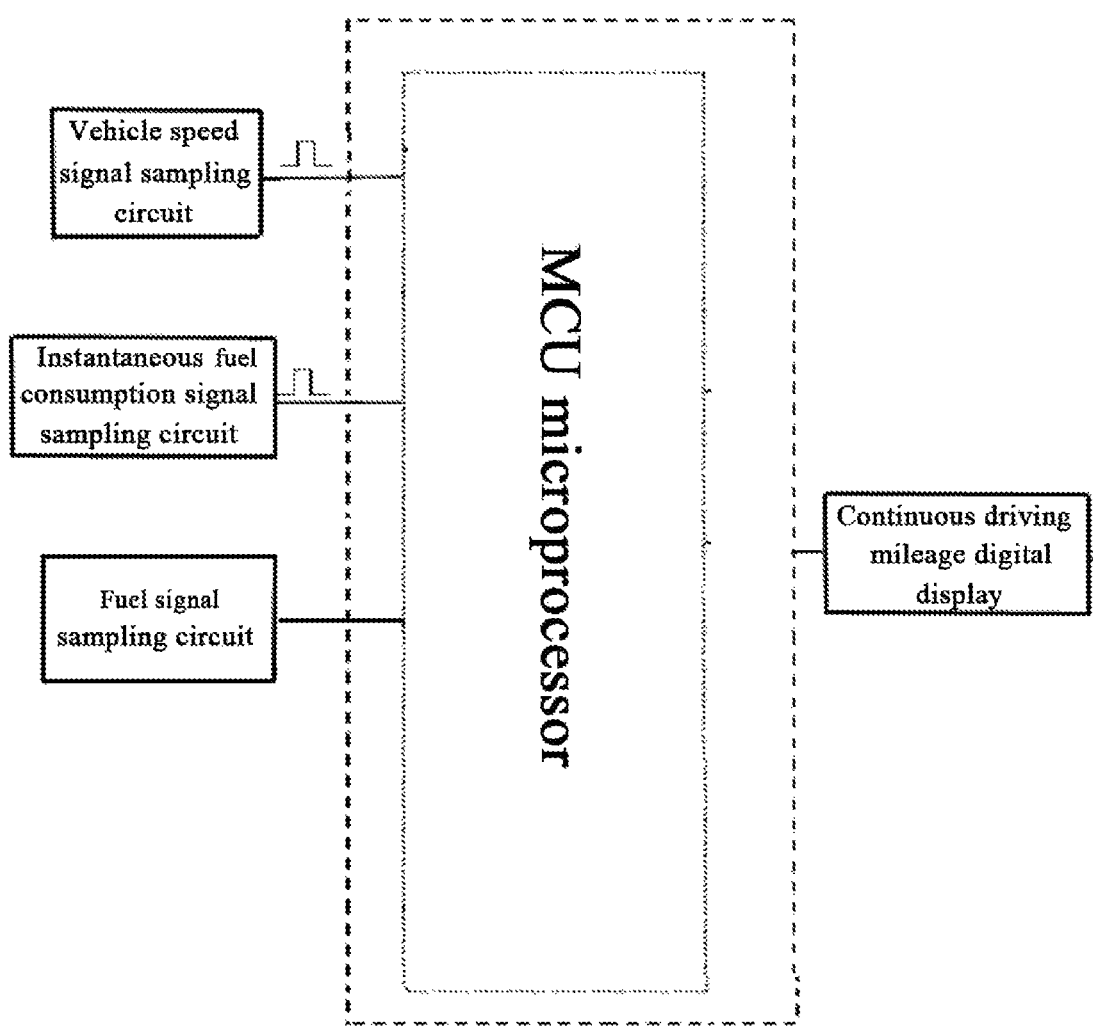
FIG. 1 is a block diagram of the continuous driving mileage calculation system according to the present invention.
Figure 3:
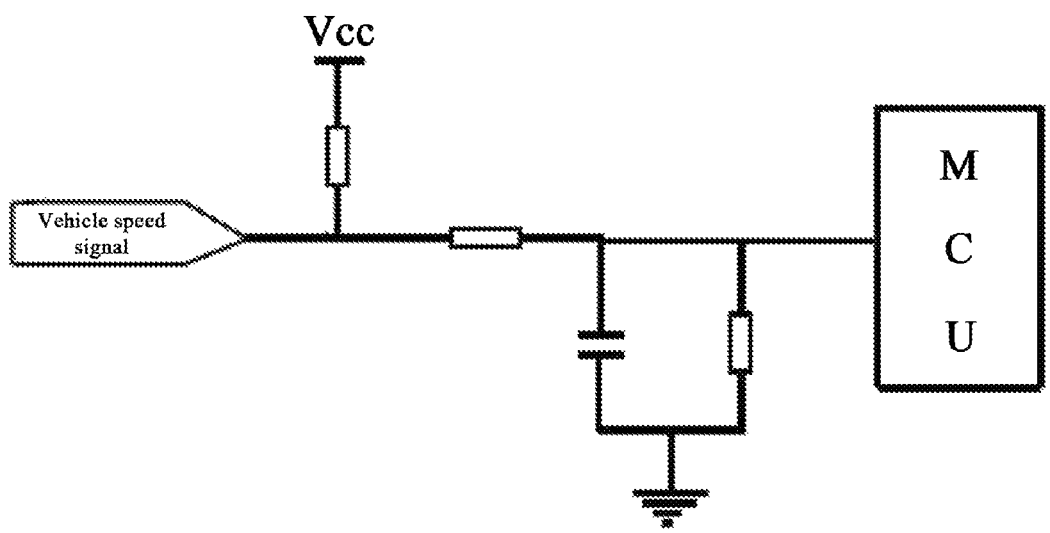
FIG. 3 is the diagram for the diagram for vehicle speed signal sampling circuit.
Figure 5:
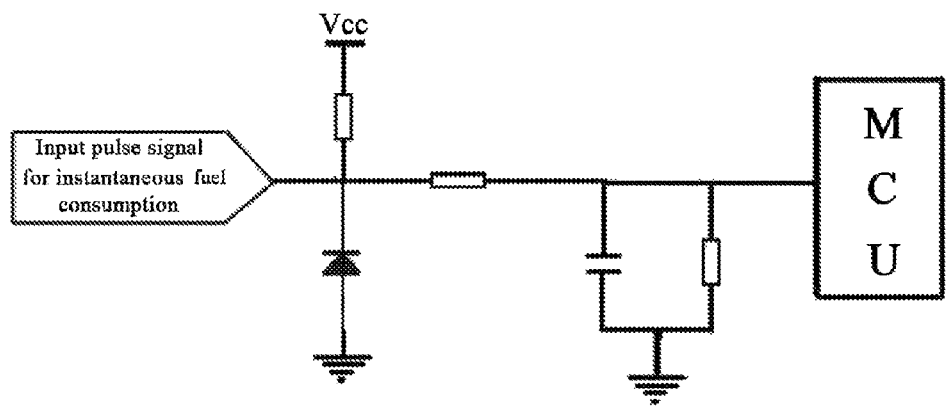
FIG. 5 is the diagram for the instantaneous fuel consumption sampling circuit.
Figure 6:
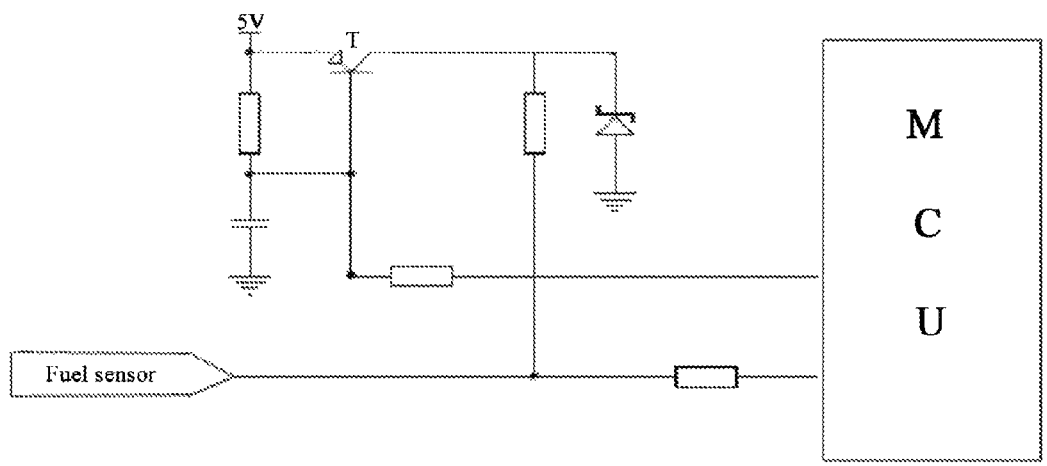
FIG. 6 is the diagram for the fuel signal sampling circuit.

As shown in FIG. 1, the continuous driving mileage control system of the present invention is composed of the following parts:

1. Vehicle speed signal sampling circuit
2. Instantaneous fuel consumption signal sampling circuit
3. fuel signal sampling circuit
4. MCU microprocessor
5. Continuous driving mileage digital display The vehicle speed signal refers to the frequency signal detected by the vehicle speed sensor. The form of the vehicle speed signal and the sampling circuit of the integrated instrument ICM are shown in FIG. 2 and FIG. 3. The instantaneous fuel consumption signal is obtained by acquiring the engine fuel injector operating pulses that are issued by the engine control unit ECU. The form of instantaneous fuel consumption signal and the sampling circuit are shown in FIG. 4 and FIG. 5. The fuel signal refers to the resistance signal of fuel system detected by the fuel sensor. The sampling circuit of integrated control instrument ICM is shown in FIG. 6.

The continuous driving mileage is calculated according to the average fuel consumption and the current remaining fuel amount, while the average fuel consumption is calculated according to the integral of the instantaneous fuel consumption and the vehicle speed. In order to avoid inaccurate calculation of the continuous driving mileage attributable to such fact that the average fuel consumption will infinitely approximate a fixed value after the vehicle has travelled a distance; the average fuel consumption in this invention is defined as the average fuel consumption per hundred kilometers, which is calculated within the distance driven between two refilling. To fulfill this requirement, the fuel control strategy is used to detect whether the vehicle has been refilled. Upon detection of refilling, the average fuel consumption is automatically reset. In this way, the amount of average fuel consumption will indicate the amount of fuel consumption per hundred kilometers between two refilling. Generally, the average fuel consumption refers to the average amount of fuel consumption per hundred kilometers within the distance driven without refilling the fuel tank (Note: The definition of the refilling action is: the fuel volume measured at the time of ignition is increased by more than 5 liter than the fuel volume measured upon prior shutting down, it is regarded as refilling). However, during a short time after the refilling (within a short distance after the average fuel consumption just being reset, such as within 8 km), the average fuel consumption is calculated according to the rated fuel consumption (This parameter is determined according to entire vehicle test), because no sufficient actual data are accumulated for calculating the actual average fuel consumption during this just-being-refilled time (i.e. shortly after the average fuel consumption being automatically reset). Therefore, during this short period (such as within 8 km), only rated average fuel consumption is used for the calculation, and after this period, actual values are used for calculating the average fuel consumption.

The remaining fuel amount is obtained by deducting the amount of fuel consumption calculated according to the instantaneous fuel consumption signal from the amount of fuel measured right after the ignition. The sampling circuit for detecting fuel amount is as shown in FIG. 5.

After receiving the sampling signals, the MCU microprocessor calculates the continuous driving mileage based on the remaining fuel amount and the average fuel consumption in the method recited above, and the calculated result is displayed on the digital display. Considering that the continuous driving mileage is primarily used for warning or reminder, it is generally necessary to process the remaining fuel volume V fuel so that the actual continuous driving mileage is bigger than the value shown on the digital display by more than 20 km. That is to say, when the digital display of continuous driving mileage reads zero, the vehicle can still travel for about 20 km.

The continuous driving mileage is displayed in digital form, so even minor changes in the average fuel consumption and remaining fuel amount can result in frequent changes in the displayed continuous driving mileage. In particular, the digital display value of continuous driving mileage may increase due to the decrease in the average fuel consumption, which could be confusing and undesirable for the user. For this reason, the control strategy includes an algorithm that enables that the value shown on the digital display of the continuous driving mileage may only decrease and may not suddenly increase.

The invention claimed is:

1. A continuous driving mileage calculation control system, comprising an MCU microprocessor, a continuous driving mileage digital display, a vehicle speed signal sampling circuit, an instantaneous fuel consumption signal sampling circuit and a fuel signal sampling circuit; wherein the vehicle speed signal sampling circuit, the instantaneous fuel consumption signal sampling circuit and the fuel signal sampling circuit are connected to the MCU microprocessor and input the sampling signals to the MCU microprocessor; wherein, the MCU microprocessor calculates the average fuel consumption according to the received instantaneous fuel consumption signal and the vehicle speed signal, and then calculates the continuous driving mileage according to the average fuel consumption and the current remaining fuel amount; the digital display is used for displaying the continuous driving mileage; the average fuel consumption mentioned above refers to the amount of fuel consumption per hundred kilometers between two refilling; and the remaining fuel amount mentioned above is obtained by deducting the amount of fuel consumption calculated according to the instantaneous fuel consumption signal from the amount of fuel measured right after the refilling; the refilling mentioned above means that the fuel volume measured at the time of automotive ignition is increased by more than 5 liter than the fuel volume measured upon prior shutting down, and the average fuel consumption is automatically reset right after refilling.

2. The continuous driving mileage control system of claim 1, wherein the instantaneous fuel consumption signal is obtained by acquiring the engine fuel injector operating pulses that are issued by the engine control unit ECU; the fuel signal refers to the resistance signal of fuel system detected by the fuel sensor.

3. The continuous driving mileage control system of claim 1, wherein within a specific distance after the refilling, rated average fuel consumption is used for calculating the continuous driving mileage.

4. The continuous driving mileage control system of claim 1, wherein the remaining fuel volume is processed so that the actual continuous driving mileage is bigger than the value shown on the digital display by more than 20 km.

5. A continuous driving mileage calculation control method, comprising the following steps:

the MCU Microprocessor receives the instantaneous fuel consumption signal, the vehicle speed signal and the fuel signal;

the average fuel consumption is calculated according to the instantaneous fuel consumption signal and the vehicle speed signal;

the continuous driving mileage is calculated according to the average fuel consumption and the current remaining fuel amount;

the continuous driving mileage is displayed on the digital display;

wherein the average fuel consumption mentioned above refers to the amount of fuel consumption per hundred kilometers between two refilling; and the remaining fuel amount mentioned above is obtained by deducting the amount of fuel consumption calculated according to the instantaneous fuel consumption signal from the amount of remaining fuel amount measured right after the refilling; the refilling mentioned above means that the fuel volume measured at the time of automotive ignition is increased by more than 5 liter than the fuel volume measured upon prior shutting down, and the average fuel consumption is automatically reset right after refilling.

6. The continuous driving mileage calculation control method of claim 5, wherein the instantaneous fuel consumption signal is obtained by acquiring the engine fuel injector operating pulses that are issued by the engine control unit ECU; the fuel signal refers to the resistance signal of fuel system detected by the fuel sensor.

7. The continuous driving mileage calculation control method of claim 5, wherein within a specific distance after the refilling, the rated average fuel consumption is used to calculate the continuous driving mileage.

8. The continuous driving mileage calculation control method of claim 5, wherein the remaining fuel volume is processed so that the actual continuous driving mileage is bigger than the value shown on the digital display by more than 20 km.

9. The continuous driving mileage control system of claim 2, wherein within a specific distance after the refilling, rated average fuel consumption is used for calculating the continuous driving mileage.

10. The continuous driving mileage control system of claim 2, wherein the remaining fuel volume is processed so that the actual continuous driving mileage is bigger than the value shown on the digital display by more than 20 km.

11. The continuous driving mileage control system of claim 3, wherein the remaining fuel volume is processed so that the actual continuous driving mileage is bigger than the value shown on the digital display by more than 20 km.

12. The continuous driving mileage calculation control method of claim 5, wherein within a specific distance after the refilling, the rated average fuel consumption is used to calculate the continuous driving mileage.

13. The continuous driving mileage calculation control method of claim 6, wherein within a specific distance after the refilling, the rated average fuel consumption is used to calculate the continuous driving mileage.

14. The continuous driving mileage calculation control method of claim 5, wherein the remaining fuel volume is processed so that the actual continuous driving mileage is bigger than the value shown on the digital display by more than 20 km.

15. The continuous driving mileage calculation control method of claim 6, wherein the remaining fuel volume is processed so that the actual continuous driving mileage is bigger than the value shown on the digital display by more than 20 km.

16. The continuous driving mileage calculation control method of claim 7, wherein the remaining fuel volume is processed so that the actual continuous driving mileage is bigger than the value shown on the digital display by more than 20 km.

17. A continuous driving mileage calculation control system, comprising:
an MCU microprocessor,
a continuous driving mileage digital display,
a vehicle speed signal sampling circuit,
an instantaneous fuel consumption signal sampling circuit, and
a fuel signal sampling circuit,
wherein the vehicle speed signal sampling circuit, the instantaneous fuel consumption signal sampling circuit and the fuel signal sampling circuit are connected to the MCU microprocessor and input the sampling signals to the MCU microprocessor,
wherein, the MCU microprocessor calculates the average fuel consumption according to the received instantaneous fuel consumption signal and the vehicle speed signal, and then calculates the continuous driving mileage according to the average fuel consumption and the current remaining fuel amount,
wherein the continuous driving mileage digital display is configured to display the continuous driving mileage,
wherein the average fuel consumption comprises the amount of fuel consumption per hundred kilometers between two refillings,
wherein the current remaining fuel amount mentioned above is determined by deducting an amount of fuel consumption calculated according to the instantaneous fuel consumption signal from the amount of fuel measured right after a refilling,
wherein the refilling mentioned above means that the fuel volume measured at the time of automotive ignition is 5 or more liters more than the fuel volume measured prior to shutting down for refilling, and the average fuel consumption is automatically reset right after refilling.

* * * * *